(12) United States Patent
Justiniano et al.

(10) Patent No.: US 6,329,596 B1
(45) Date of Patent: Dec. 11, 2001

(54) MOUNTING STRAP DEVICE

(75) Inventors: Joseph G. Justiniano, Centereach, NY (US); Danilo F. Estanislao, Old Bridge, NJ (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 09/421,462

(22) Filed: Oct. 19, 1999

(51) Int. Cl.⁷ ........................................... H02G 3/14
(52) U.S. Cl. .................. 174/66; 174/67; 220/241; 220/242
(58) Field of Search .................. 174/53, 58, 66, 174/67, 57, 49; 439/107, 539; 220/241, 242, 3.8, 3.92, 4.02; D8/353; D13/152

(56) References Cited

U.S. PATENT DOCUMENTS

| | | | |
|---|---|---|---|
| 269,427 | * 12/1882 | Kilé | ........................................ 172/679 |
| D. 269,427 | 6/1983 | Doyle et al. | . |
| 2,231,976 | * 2/1941 | Von Holtz | ............................. 439/539 |
| 2,292,084 | * 8/1942 | Pistey | ...................................... 174/53 |
| 3,059,045 | * 10/1962 | Swartwood | ............................. 174/53 |
| 4,025,144 | * 5/1977 | Thiebeault | ......................... 174/53 X |
| 5,336,979 | 8/1994 | Watson et al. | . |
| 5,484,309 | * 1/1996 | Howard et al. | ................... 439/107 X |
| 5,723,817 | * 3/1998 | Arenas et al. | .......................... 174/66 |

\* cited by examiner

*Primary Examiner*—Dean A. Reichard
*Assistant Examiner*—Dhiru R Patel
(74) *Attorney, Agent, or Firm*—Paul J. Sutton

(57) ABSTRACT

A mounting strap device can be configured to mount a number of different types of wallplates of decreasing length. A central body portion has removable tabs which engage a wallplate of a first length and a first type. The removable tabs can be removed to expose pairs of removable members at the strap device ends which contain flexible latch pawls to mount a second, shorter type wallplate. The removable members can be removed to allow the mounting strap device to be fixed to a shorter length, third type wallplate by means of threaded fasteners.

11 Claims, 13 Drawing Sheets

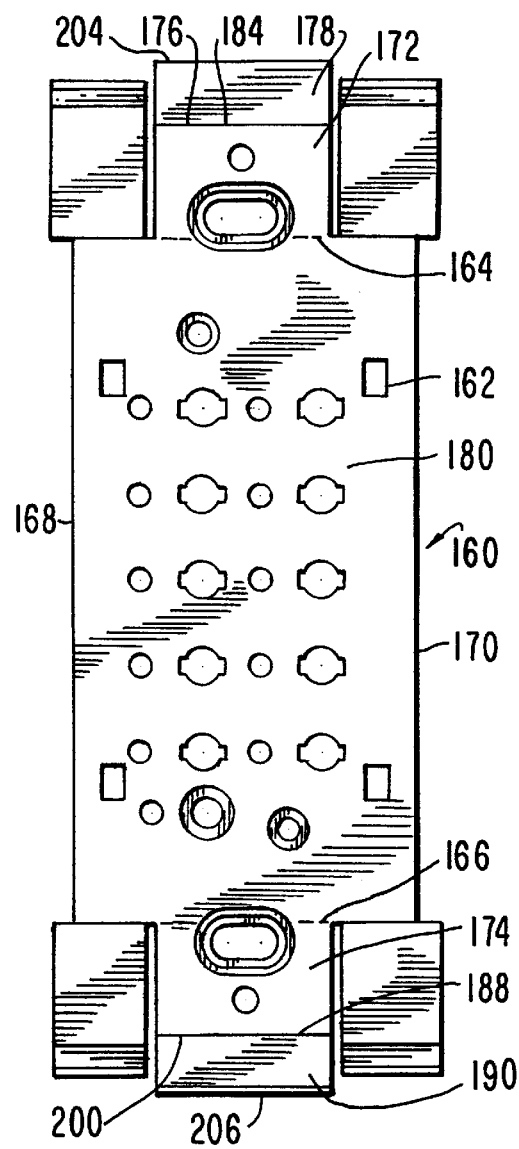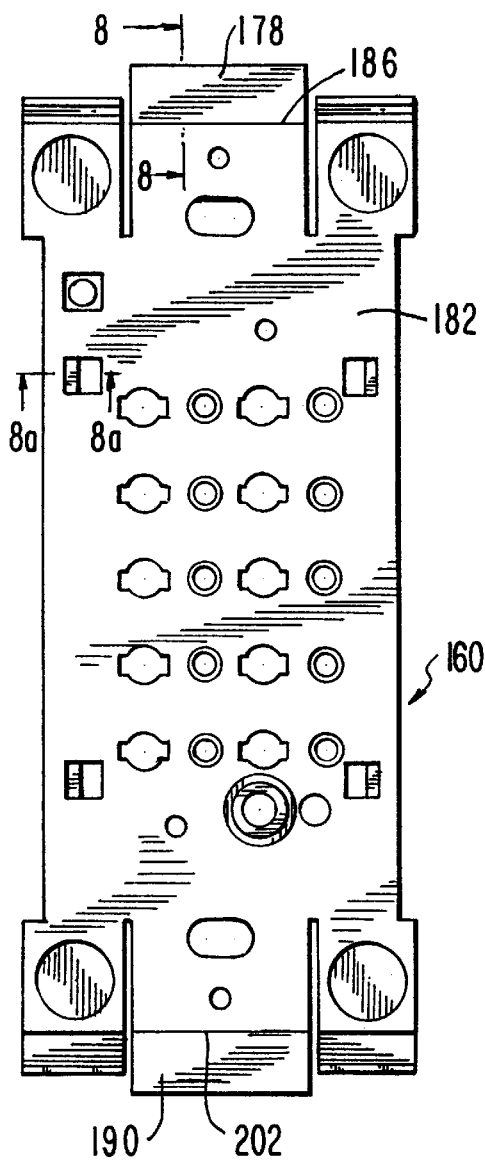
FIG. 7    FIG. 6
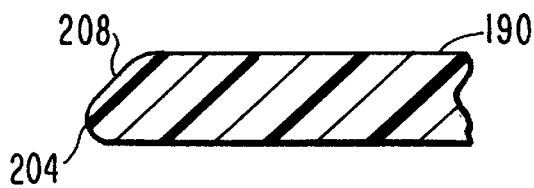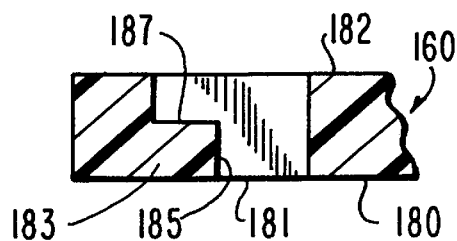
FIG. 8    FIG. 8a

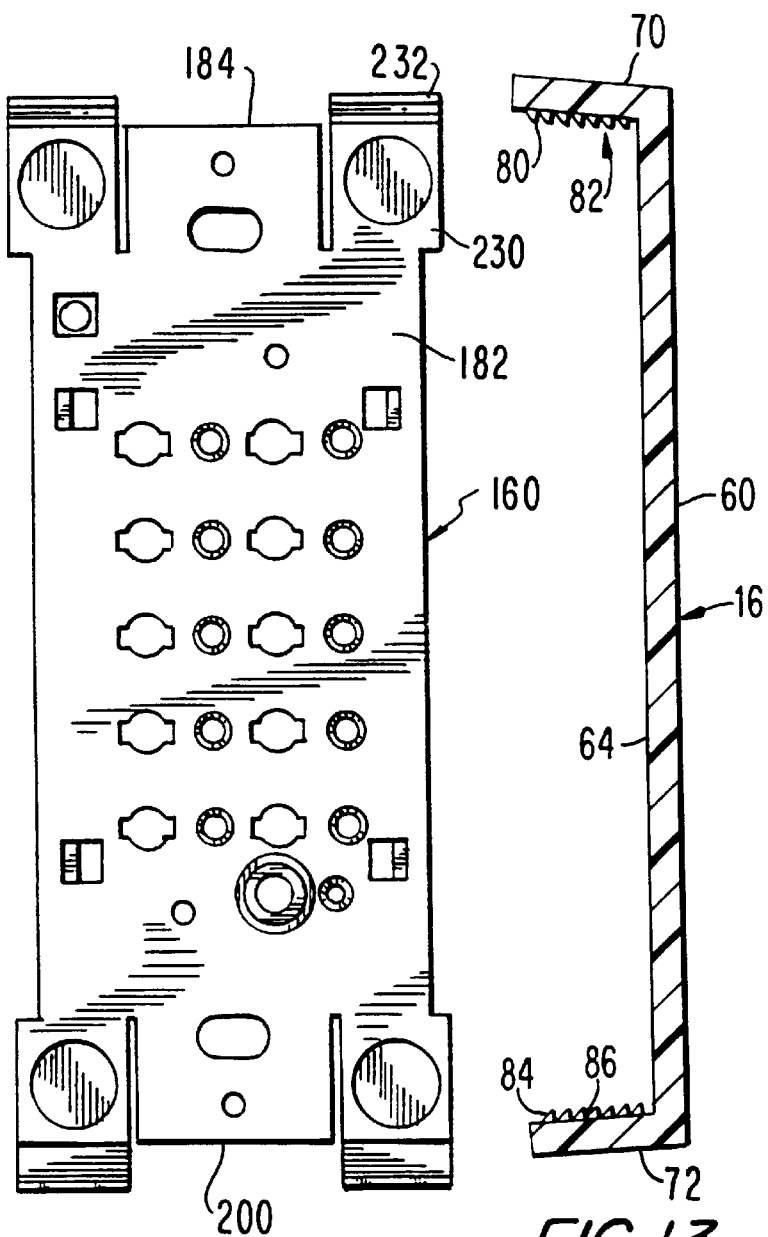
FIG.12
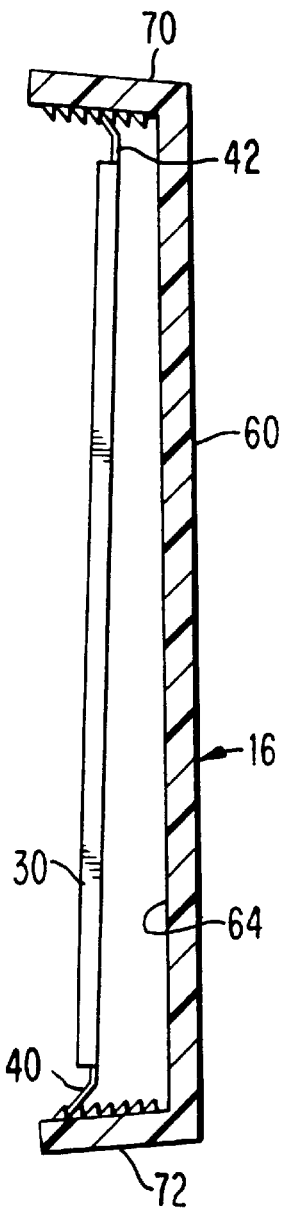
FIG.13
PRIOR ART
FIG.14
PRIOR ART

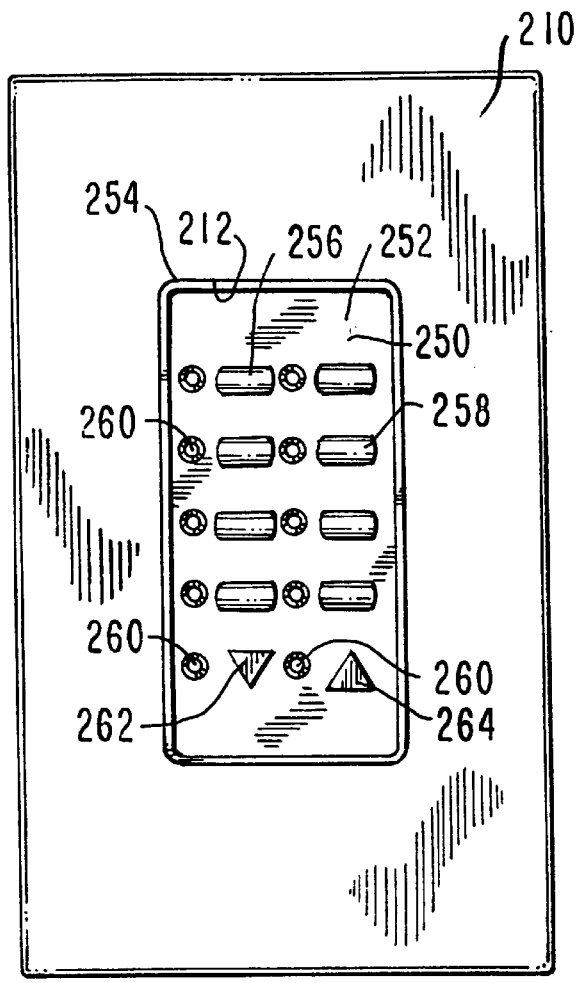
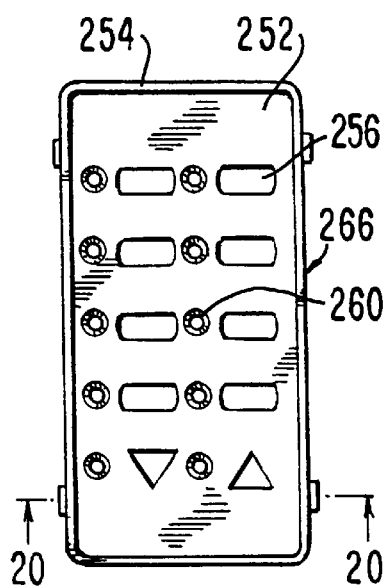
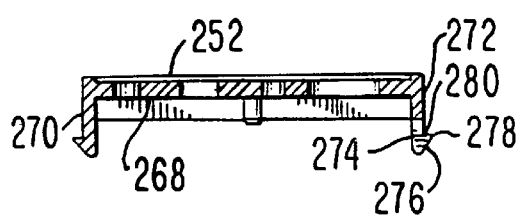
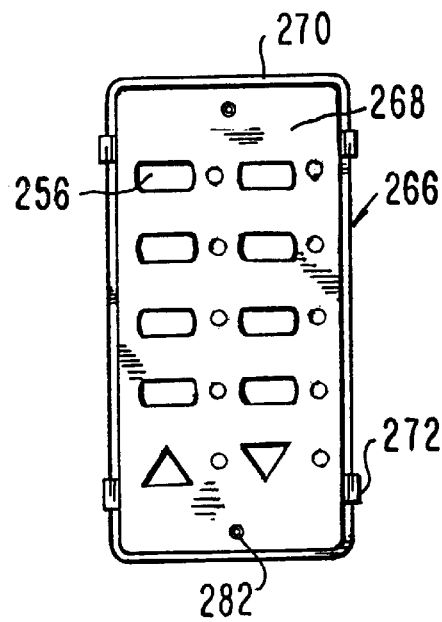
FIG. 17
FIG. 18
FIG. 20
FIG. 19

MOUNTING STRAP DEVICE

BACKGROUND OF THE INVENTION

1. Field of the Invention

The invention is directed to the field of electrical wiring devices and more particularly to wallplates placed over electrical wiring devices, their supports and adjacent wall surfaces to provide a finished appearance to the installation of the wiring device and prevent access to the device and its attendant electrical wiring.

2. Description of the Prior Art

At present mounting straps are provided with each electrical wiring device to permit such device to be mounted to a gang box or a support. The mounting straps are provided with threaded apertures to receive the threaded fasteners of standardized wallplates. The heads of the threaded fasteners are visible from the front of the wallplate. The size of the wallplates may be varied as long as the position and spacing of the threaded apertures in the mounting straps match the standardized mounting holes set for wallplates.

Special wallplates that are fastened to mounting straps with fastening systems that are not visible from outside of the wallplate require special adapters for use with the mounting straps. There are no known mounting strap devices or adapters which operate with multiple wallplate mounting systems.

SUMMARY OF THE INVENTION

A single mounting strap device which can be used with a number of different wallplates and wallplate mounting systems is provided. The mounting strap device has a generally rectangular body portion to which are attached a number of removable tabs and members each of which provides unique structures for the mounting of wallplates. The mounting tabs engage a first type of wallplate and hold it in position on a wiring device, support or the like. These first removable mounting tabs can be removed along prescored lines to expose a plurality of removable members each of which terminates in latch pawls. The removal of the mounting tabs shortens the length of the mounting strap device and permits the mounting strap device to be used with a shorter wallplate. The removal of the removable members along prescored lines also removes the latch pawls and shortens the length of the mounting strap device further. The mounting strap device, with the removable tabs and members removed, can now fit within a third, shorter length wallplate which can be anchored to the mounting strap device by threaded fasteners. It is an object of the instant invention to provide a novel mounting strap device which can be used with a number of different sized wallplates.

It is an object of the instant invention to provide a novel mounting strap which can be used with a number of differently configured wallplates.

It is yet another object of the instant invention to provide a novel mounting strap having a number of removable tabs and members each of which provides a different mounting means.

It is still another object of the instant invention to provide a novel mounting strap having a number of removable tabs and members each of which provides a different mounting means, and which exposes such different mounting means by the removal of such removable tabs and members.

Other objects and features of the invention will be pointed out in the following description and claims and illustrated in the accompanying drawings, which disclose, by way of example, the principles of the invention, and the best mode which is presently contemplated for carrying them out.

BRIEF DESCRIPTION OF THE DRAWING

In the drawing in which similar elements are given similar reference characters:

FIG. 6 is a top plan view of a mounting strap device constructed in accordance with the concepts of the invention.

FIG. 7 is a bottom plan view of the device in FIG. 6.

FIG. 8 is a fragmentary, side elevational view, in section, of the mounting strap device taken along the line 8—8 in FIG. 7.

FIG. 8a is a fragmentary, front elevational view, in section, of the mounting strap device taken along the line 8a—8a in FIG. 7.

FIG. 12 is a bottom plan view of the mounting strap device of FIG. 11.

FIG. 13 is a side elevational view, in section, of the cover or wallplate of the device of the '817 patent and is FIG. 4 of such patent.

FIG. 14 is a side elevational view, partially in section, of the cover or wallplate of FIG. 13 engaged by an attachment plate and is FIG. 5 of the '817 patent.

FIG. 17 is a top plan view of a dimmer button module installed to a wallplate by means of a mounting strap device according to the instant invention but not visible in the figure.

FIG. 18 is a top plan view of the frame of the dimmer button module shown in FIG. 17.

FIG. 19 is a bottom plan view of the frame of FIG. 18.

FIG. 20 is a front elevational view, partly in section of the frame taken along line 20—20 in FIG. 18.

DESCRIPTION OF THE PREFERRED EMBODIMENT

Figure 1:
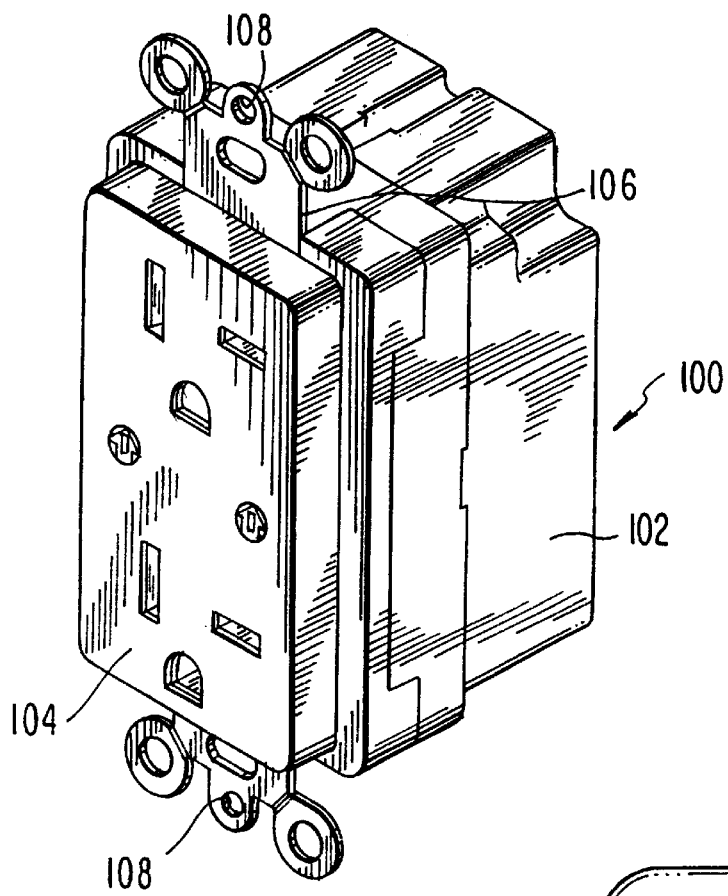
FIG. 1 is a front perspective view of a wiring device showing a through mounting strap according to the prior art and is FIG. 1 of U.S. Pat. No. Design 269,427 issued Jan. 21, 1983.
Figure 2:
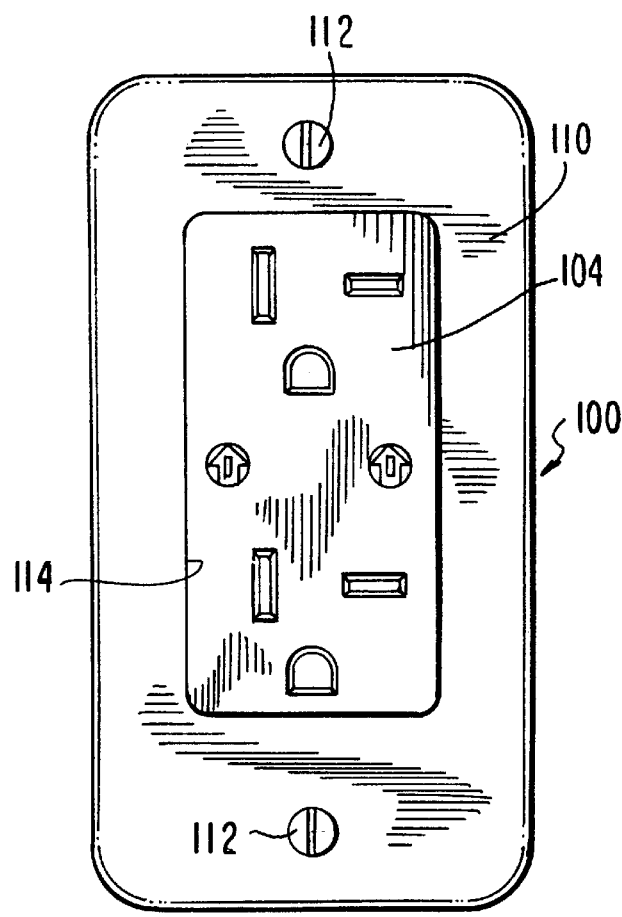
FIG. 2 is a front elevational view of the wiring device of FIG. 1 with a wallplate added and is based upon FIG. 3 of the '427 patent.

Turning first to FIG. 1, there is shown a wiring device 100 having a body 102, a front cap 104 and a mounting strap 106 which extends between body 102 and front cap 104 or through wiring device 100. Adjacent the ends of mounting strap 106 are threaded apertures 108 which receive threaded fasteners 112 therein to mount a wallplate 110 to the wiring device 100 as shown in FIG. 2. The front cap 104 extends through aperture 114 to provide access to the wiring device 100 and the heads of the threaded fasteners 112 are visible from the front of the wallplate 110.

In the strap shown in FIGS. 1 and 2 the wallplate 110 is attached to the mounting strap 106 by means of a threaded fastener 112 which extends through a clearance hole (not shown) in the wallplate 110 and engages a threaded aperture 108 in the mounting strap 106. The head of the threaded fastener 112 remains exposed and in plan sight at the front of the wallplate. To eliminate the threaded fastener 112, different means are needed to join the wallplate to the wiring device. One technique employed to do this is shown in U.S. Pat. No. 5,723,817 issued Mar. 3, 1998 and assigned to the assignee of the instant invention and by this reference made a part hereof That patent uses an intermediate member or adapter which is fastened to the wiring device and which in turn is fastened to a different type of wallplate in such a manner as to present a clean, smooth, unbroken surface with no visible fasteners.

The system of the '817 patent is shown in FIGS. 3, 4, 5, 13 and 14. A rocker switch 18 is mounted to the mounting ears 21 of a ganged box 13 by fasteners (not shown) which pass through slots in lugs 22 and are threaded into threaded apertures 23. An attachment plate 30 is attached to the rocker switch 18 by fasteners 26 which pass through apertures 32 and threadably engage threaded apertures 24. The attachment plate 30 has two latching pawls 40 and 42 at each respective end of plate 30 which engage the saw-tooth shaped teeth 82 of the racks 80 on the inner surfaces of the end walls or ridges 70 and 72 of the cover or wallplate 16. This wallplate 16 can not be used directly with the mounting strap 106 of FIG. 1 because of the absence of the latching pawls 40 and 42 and because wallplate 16 does not have apertures through which fasteners can pass to engage threaded apertures on the mounting strap.

Figure 3:
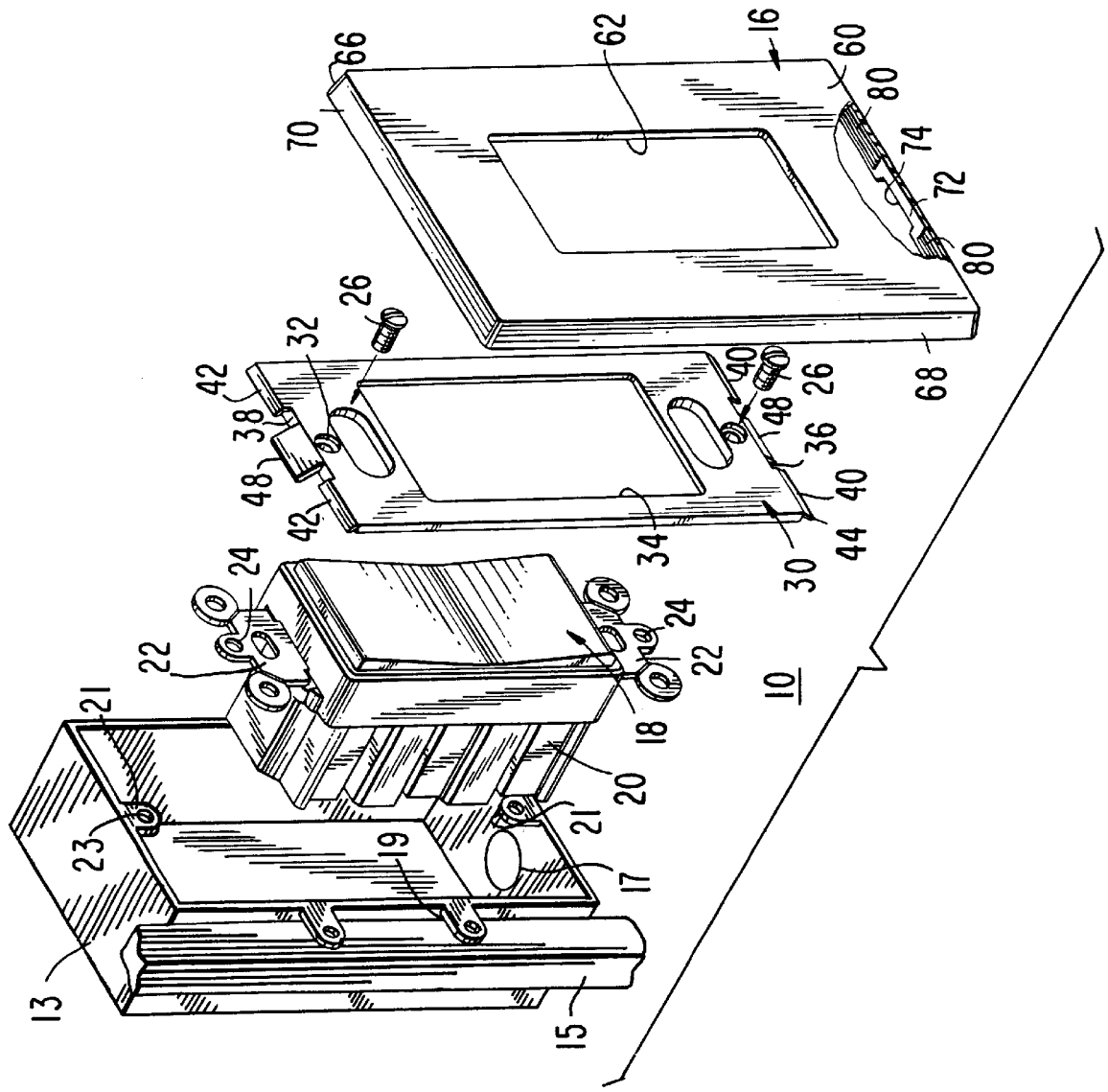
FIG. 3 is an exploded wallplate mounting system according to the prior art and is FIG. 2 of U.S. Pat. No. 5,723,817 issued Mar. 3, 1998.
Figure 4:
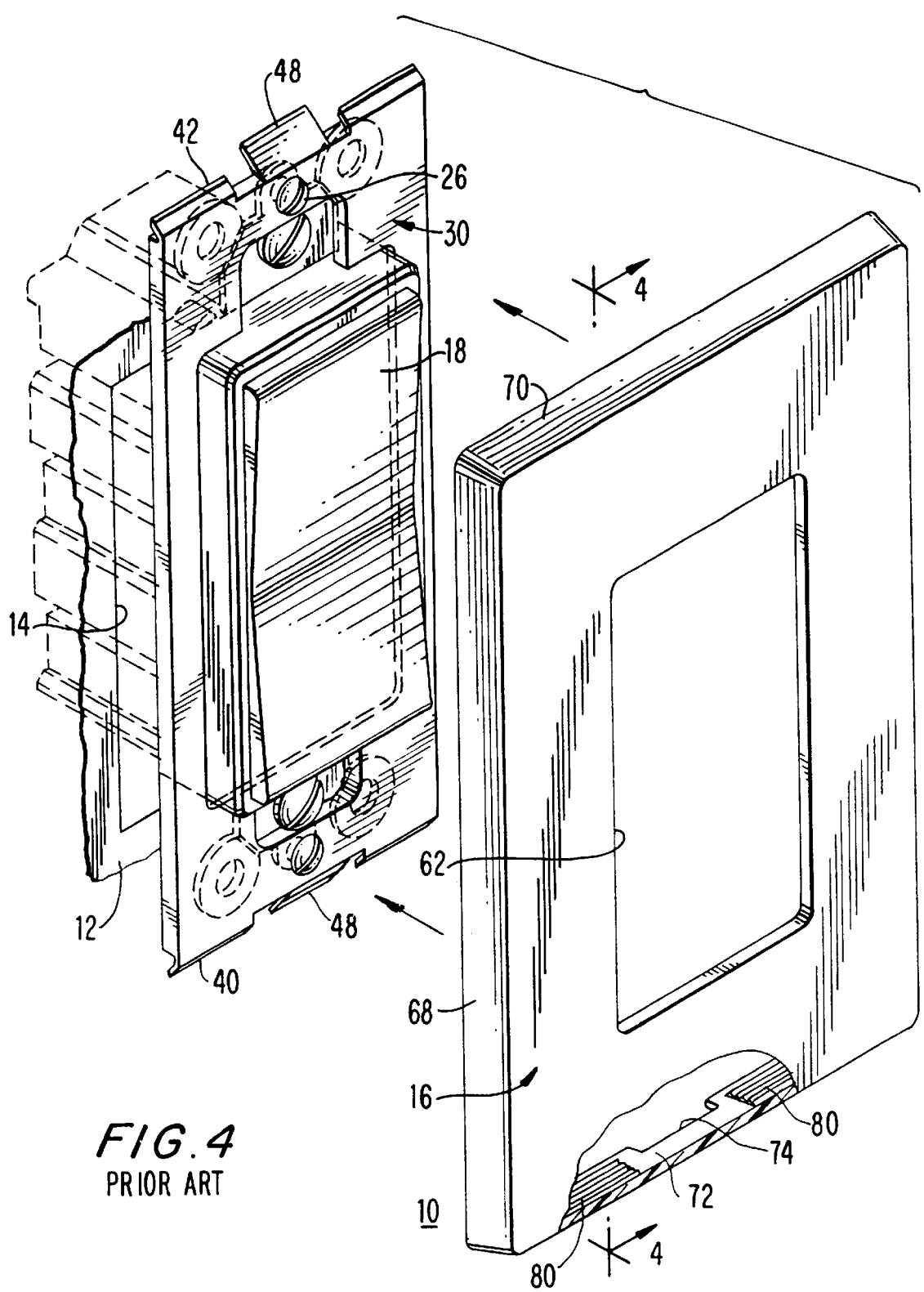
FIG. 4 is an exploded front perspective view of the mounting system of FIG. 3 partly assembled and is FIG. 3 of the '817 patent.
Figure 5:
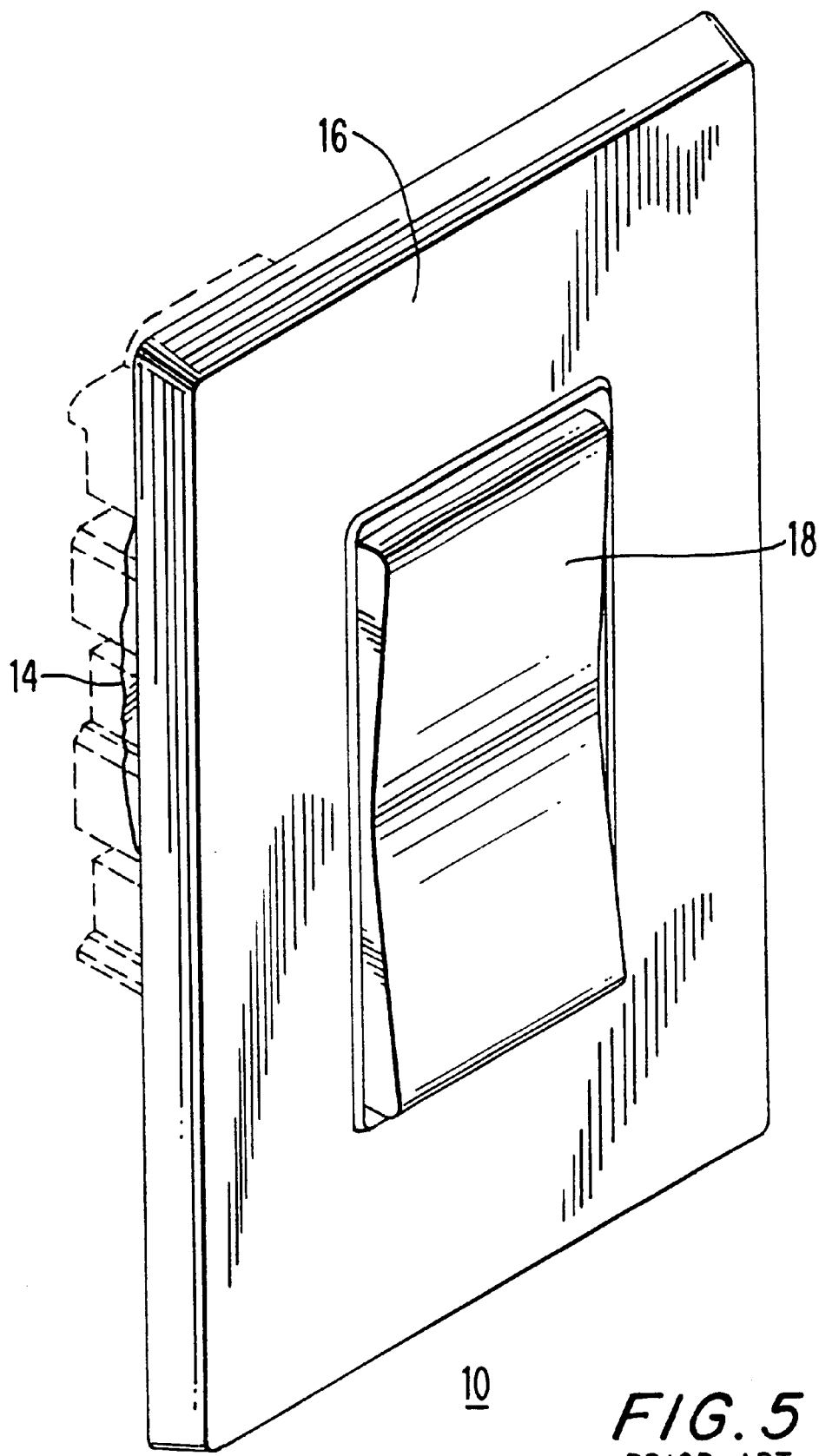
FIG. 5 is a front perspective view of the mounting system of FIG. 3 fully assembled and is FIG. 1 of the '817 patent.

Turning now to FIGS. 6, 7, 8, 9 and 10 there is shown a mounting strap device 160 which can be used with a number of different types and sizes of wallplates and can be used with a wallplate such as 16 of FIG. 3 as well as others to be described below. Mounting plate device 160 has a generally rectangular body portion 162 having a top edge 164, a generally parallel, spaced apart bottom edge 166 and two parallel, spaced apart, side edges 168, 170. From the central portion of top edge 164 projects an extension 172 and a similar extension 174 projects from the central portion of bottom edge 166. At the free end 176 of extension 172 is placed a removable tab 178 and the joint is scored on both the top surface 180 as at 184 and the bottom surface 182 as at 186, respectively of mounting strap device 160 to make the tab 178 easily separable from extension 172 by bending the tab 178 at the score lines 184, 186.

Similarly at the free end 188 of extension 174 is placed a removable tab 190 and the joint is scored on both the top surface 180 as at 200 and the bottom surface 182 as at 202, respectively of mounting strap device 160 to make the tab 190 easily separable by bending the tab 190 at the score lines 200, 202. With the removable tabs 178 and 190 in place the mounting strap device 160 has its greatest length.

The free ends 204 and 206 of the removable tabs 178 and 190 are outwardly tapered as at 208. The free end 204 of removable tab 178 is shown in FIG. 8. The free end 206 of removable tab 190 is the same but extends in the opposite direction.

Figure 9:
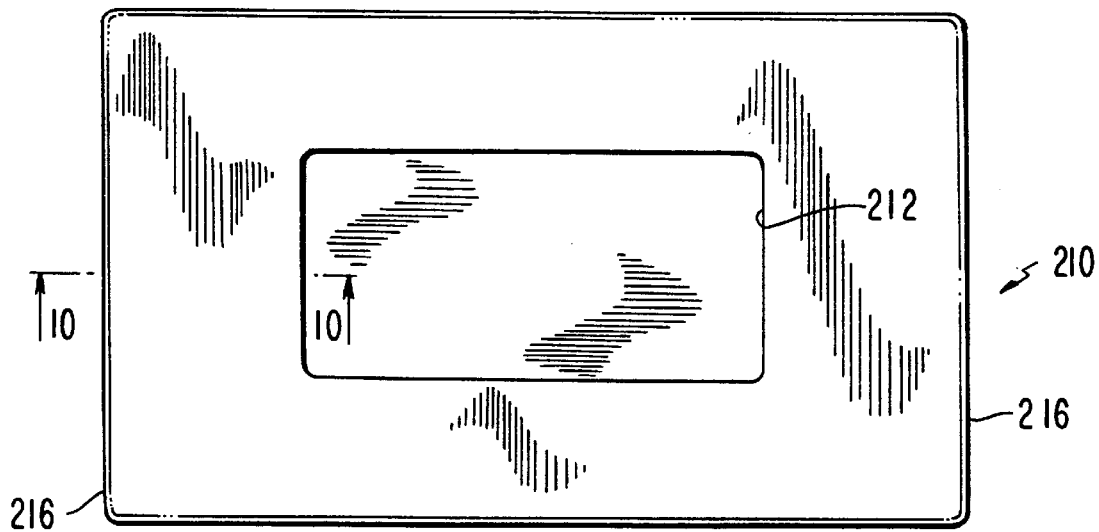
FIG. 9 is a top plan view of a wallplate for use with the instant invention.
Figure 10:
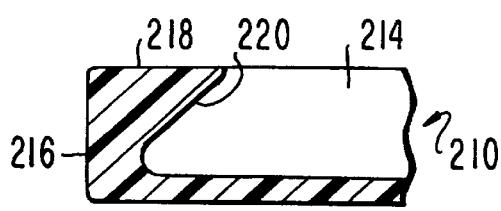
FIG. 10 is a fragmentary, side elevational view, in section, of the wallplate taken along the line 10—10 of FIG. 9.

The wallplate 210 of FIGS. 9 and 10 mates with the free ends 204 and 206 as will presently be sent out. The wallplate 210 is generally rectangular with a rectangular cutout 212 through which extends a portion of the wiring device such as the front cap 104 of the wiring device 100 of FIG. 1. A ridge 214 runs around the periphery of wallplate 210 and is shown in FIG. 10 (the wallplate 210 is inverted). At the ends 216, the ridge 214 is thickened as at 218 to provide a complementary shaped lip 220, shown in FIG. 10, which matches the tapered end 204 of removable tab 190. The mounting strap device 160 snaps into wallplate 210 with each of the tapered ends 204, 206 of the mounting strap device 160 in engagement with the lip 220 (see the assembled engagement in FIG. 26). This unites the mounting strap device 160 at its greatest length with the longest wallplate 210 with which it can be used.

Figure 11:
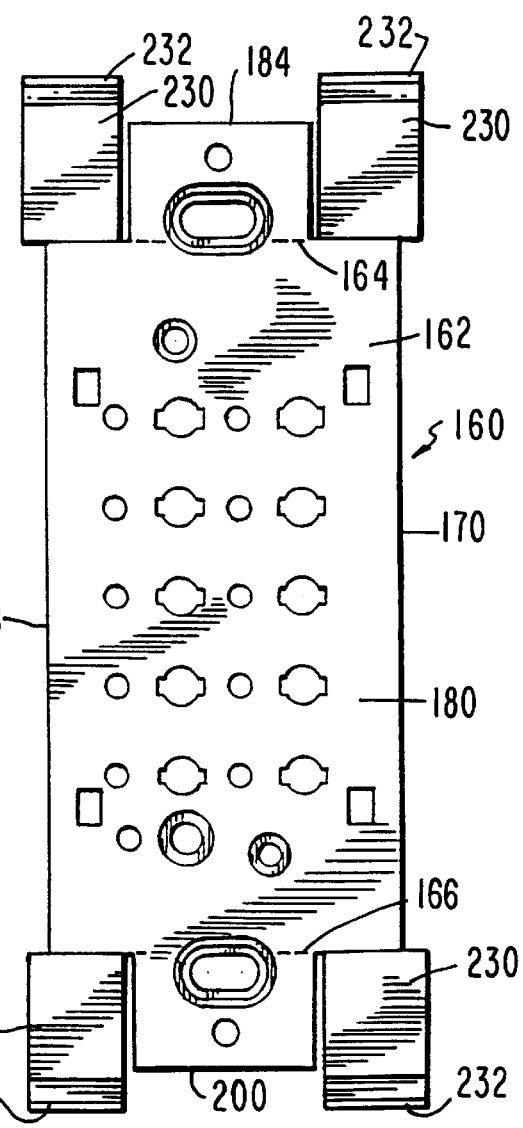
FIG. 11 is a top plan view of the mounting strap device of FIG. 10 with the removable tabs removed to expose the latch pawls of the removable members.
Figure 27:
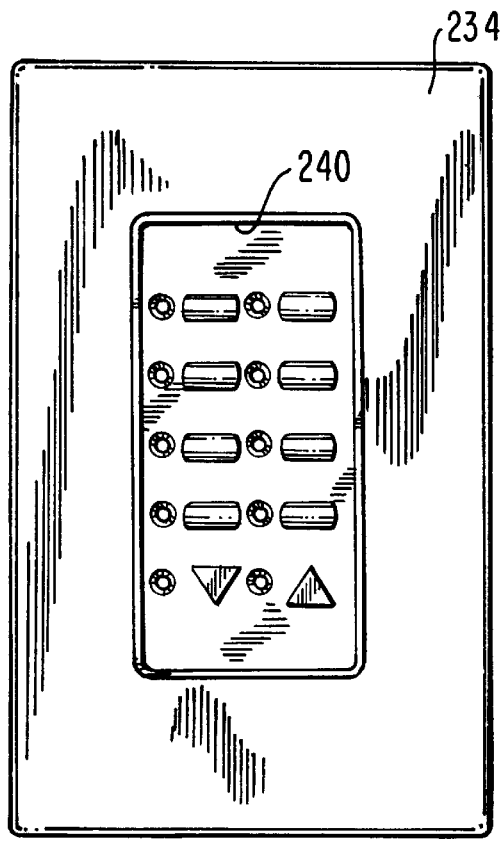
FIG. 27 is a top plan view of a dimmer button module assembled to a mounting strap device (not visible) and further assembled to a second type of wall plate.
Figure 28:
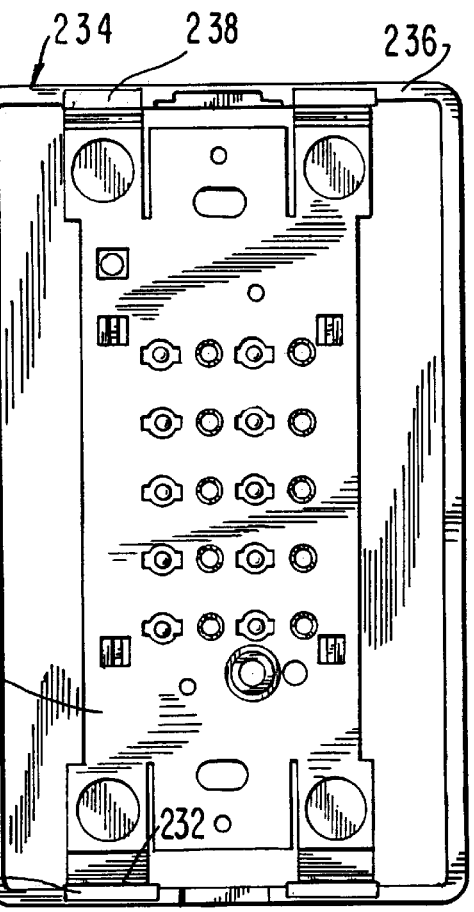
FIG. 28 is a bottom plan view of the device of FIG. 27 with the mounting strap device visible.

The removable tabs 178, 190 can now be removed by bending tab 178 about score lines 184 or 186 or alternately about score lines 184 and 186. Tab 190 can be removed also by bending along score lines 200 or 202 or alternately about score lines 200 and 202. With removable tabs 178 and 190 removed, as is shown in FIGS. 11 and 12, the overall length of the mounting plate device 160 is shortened and the latch pawls 232 are exposed at the ends of the four removable side members 230. By "exposed" it is meant that the latch pawls 232 extend beyond the ends 176, 188, respectively, of the extensions 172, 174 respectively, and are available to engage the teeth 82 of the racks 80 on the inside surface of a wallplate 16 as shown in FIGS. 13 and 14. The latching pawls 232 on the mounting plate device 160 will operate as shown in FIG. 14 for the latching pawls 40 and 42 on the attachment plate 30. For a fuller explanation, this operation is described in the above identified U.S. Pat. No. 5,723,817. The wallplate 234 is shown in FIGS. 27 and 28 and has a ridge 236 running about its outer peripheral edge into which are formed racks of teeth 238 which are engaged by latch pawls 232. Wallplate 234 also has a central cut-out 240. The length of the wallplate 234 is shorter than that of wallplate 210 to accommodate the shortened mounting strap device 160.

Two of the removable side members 230 are each placed to one side of extension 172 and are separated from it. Similarly, the remaining two of the removable side members 230 are each placed to one side of extension 174 and separated from it. The top surface 180 of the mounting strap device 160 is scored along top edge 164 adjacent the two removable side members 230 only and is scored along bottom edge 166 adjacent the remaining two removable side members 230 only to permit removal of the removable side members 230 by bending them about their score lines.

Figure 15:
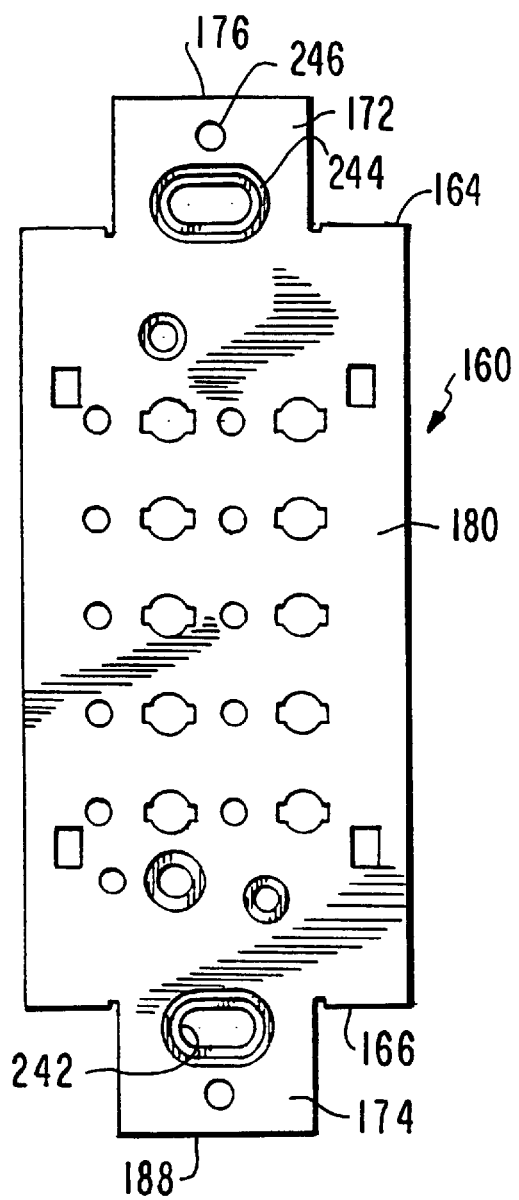
FIG. 15 is a top plan view of the mounting strap device of FIG. 11 with the removable members removed.
Figure 16:
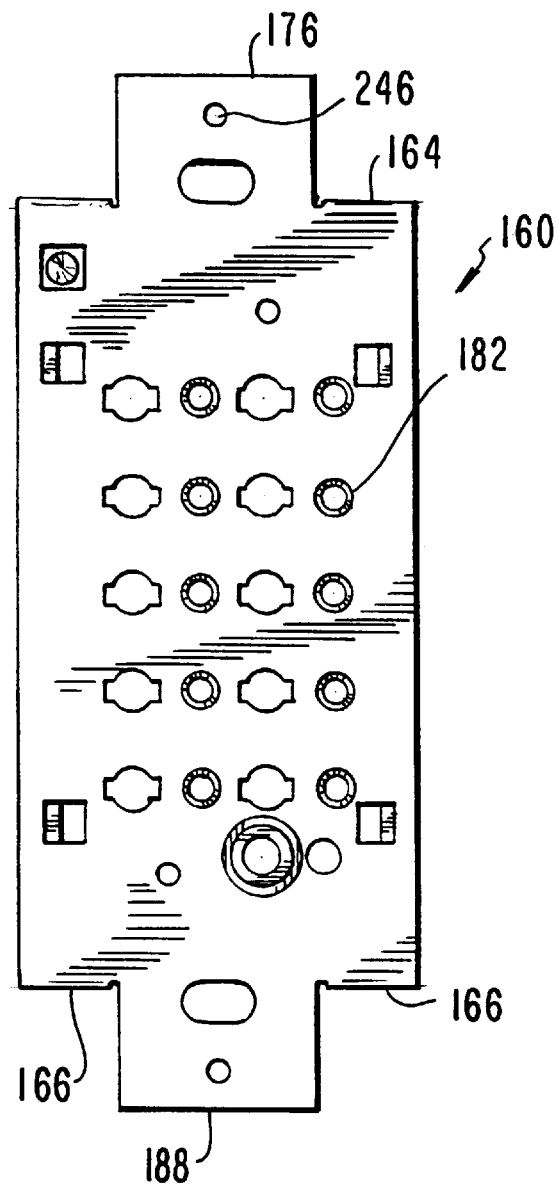
FIG. 16 is a bottom plan view of the mounting strap device of FIG. 15.
Figure 21:
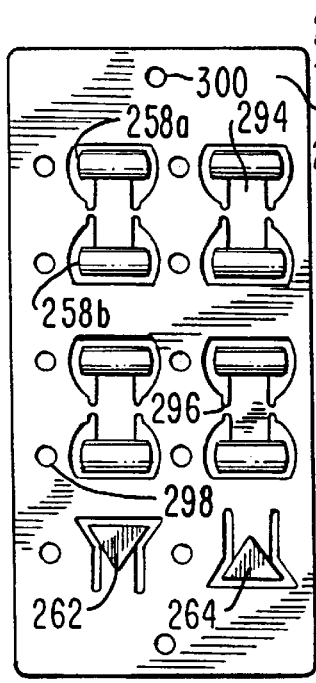
FIG. 21 is a top elevational view of the button array of the dimmer button module of FIG. 17.
Figure 22:
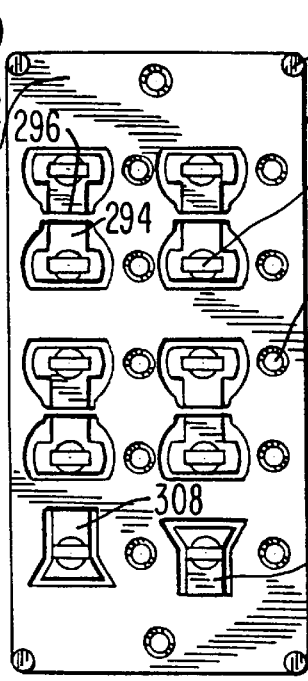
FIG. 22 is a bottom plan view of the button array of FIG. 21.
Figure 29:
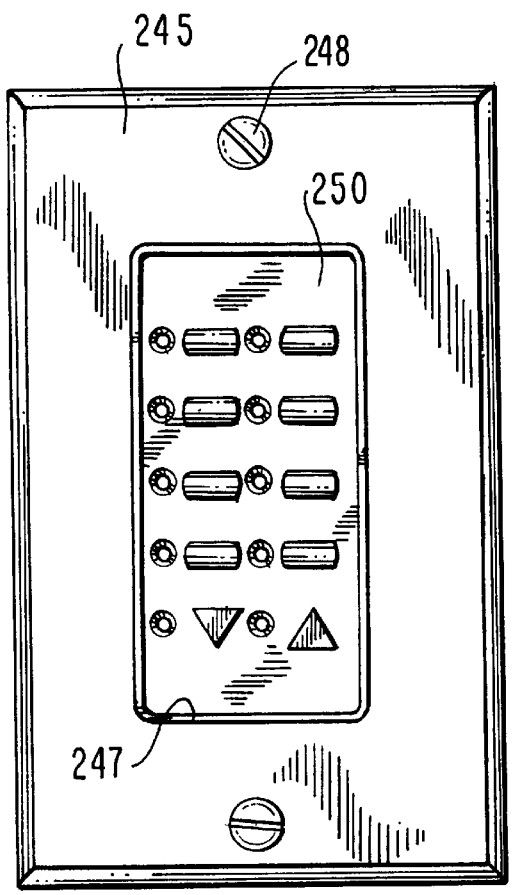
FIG. 29 is a top plan view of a dimmer button module assembled to a mounting strap device (not visible) and further assembled to a third type of wallplate.
Figure 30:
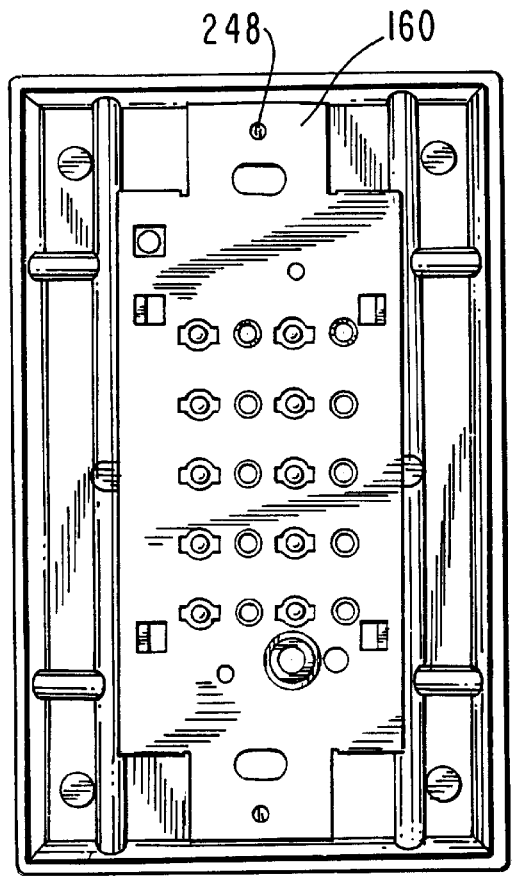
FIG. 30 is a bottom plan view of the device of FIG. 29 with the mounting strap device visible.

By removing the removable side members 230 the mounting strap device 160 is reduced to its shortest length and is matable with the shortest wallplate. The mounting strap device 160, with the removable side members 230 removed is shown in FIGS. 15 and 16. The mounting strap device 160 has two slots 242, one adjacent top edge 164 and the other adjacent bottom edge 166. The slots 242 are surrounded by stepped walls 244 so that they can accommodate mounting screws having different diameter heads. Mounting screws (not shown) are passed through slots 242 and threadably engage threaded apertures 23 in the mounting ears 21 of a gang box 13 as shown in FIG. 3. The heads of the mounting screws (not shown) come to rest on one of the steps of the stepped walls 244. The mounting strap device 160 also has threaded apertures 246 in each of its extension 172, 174 between slots 242 and the edges 176, 188, respectively, of the extensions 172, 174, respectively, to receive a mounting fastener 248, as shown in FIGS. 29 and 30. The mounting fasteners 248 are passed through apertures (not shown) in the wallplate 250 and are made to threadably engage the threaded apertures 246 to mount the wallplate 250 to the mounting strap device 160. The mounting fasteners 248 are tightened until the head rests on one of the steps of the stepped wall 244 and the wallplate 250 is fully against the mounting strap device 160.

Turning now to FIGS. 17 to 23 there is shown a button module 250 to be used to operate a dimmer device (not shown). The button module 250 has a generally flat front face 252 bounded by a raised rim 254 which engages the edges of the cut-out 212 of the wallplate 210 as shown in FIG. 17. There are two rows of slots 256 through which extend buttons 258 which can be used to select a dimmer setting or set a dimmer control (not shown) to a desired level. Adjacent each button 258 is an aperture 260 behind which can be located an indicator lamp to show which button 258 has been selected.

A first row of buttons 258 ends in a downwardly pointed triangular button 262 also flanked with an aperture 260 which can be placed in front of an indicator lamp. Button 262 can be used to downwardly set the dimmer control. Similarly, the second row of buttons 258 ends in an upwardly pointed triangular button 264 flanked by an aperture 260 through which an indicator lamp can be seen. Button 264 can be used to upwardly set a dimmer control. Dimmer module 250 is composed of two parts, a frame 266 shown in FIGS. 18 (top view), 19 (bottom view) and 20 (sectioned end view) and a button array 290 shown in FIG. 21 (top view) and FIG. 22 (bottom view).

Figure 25:
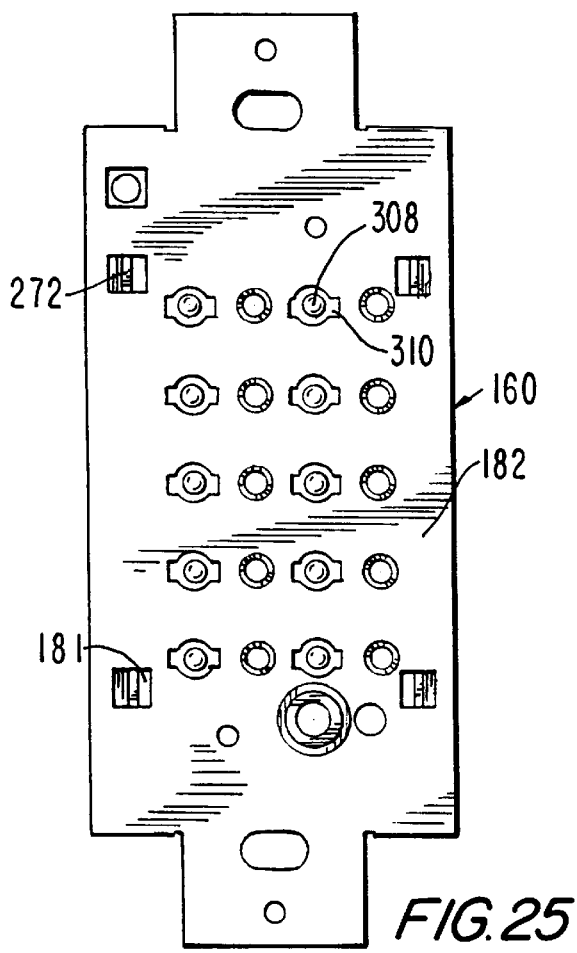
FIG. 25 is a bottom plan view of the dimmer button module of FIG. 17 as it appears from the bottom surface of the mounting strap device of FIG. 1 16.

The rear face 268 of the frame shows the slots 256 and the triangular openings for the triangular buttons 262 and 264. A low wall 270 surrounds the entire periphery of the rear face 268. Four assembly fingers 272 extend from the wall 270. Each assembly finger ends in a latch 274 (see FIG. 20) made up of an inclined surface 276 to deflect the latch 274 as it is positioned and a flat locking surface 280 with a short parallel face 278 between them. The latch 274 operates with the latch step 183 of the mounting strap device 160 as shown in FIG. 8a. The latch 274 enters opening 181 and inclined surface 276 bears against front wall 185 of latch step 183 which forces assembly finger 272 to slightly deflect inwardly. This continues until the locking surface 280 is free of the opening 181 and the assembly finger 272 springs outwardly to its initial position and places locking surface 280 over top surface 187 of latch step 183. This operation is the same for all four of the assembly fingers 272 and locks the frame 266 to the mounting strap device 160 as shown in FIG. 25. An assembly pin 282 is set at each end of rear face 268.

The button array 290 consists of a flat plate 292 in which are formed four button pairs 258a and 258b and triangular buttons 262 and 264. Each of the button pairs 258a and 258b are joined by a web 294 which is pivotally mounted to flat plate 292 by pins 296. Each of the buttons 258a and 258b can be operated without affecting the other button of the pair. Apertures 298 permit indicator lamps in the dimmer until (not shown) to be seen through apertures 260 of frame 266. Apertures 300 at each end of flat plate 292 receive assembly pins 282 to permit proper alignment of the button array 290 with frame 266. The periphery of flat plate 292 is sized to permit a press fit of the flat plate 292 within the low wall 270 of frame 266. The position of button array 290 with frame 266 is further fixed when the button module 250 is fixed to the mounting strap device 160.

Figure 23:
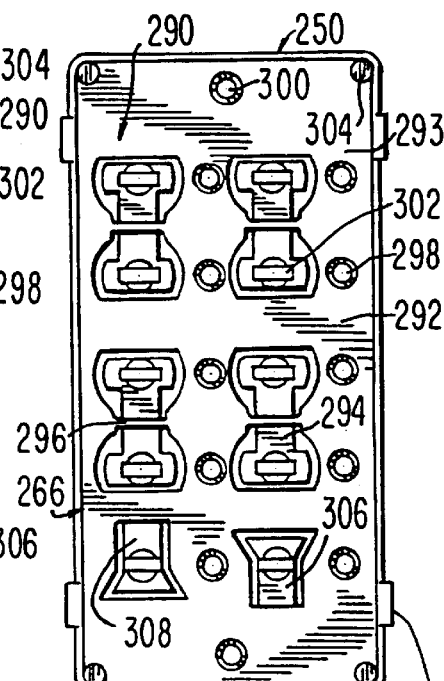
FIG. 23 is a bottom plan view of the button array of FIG. 22 assembled with the frame of FIG. 19.

Projecting from each of the buttons 258, 262 and 264 are rods 302 which will engage the corresponding switches of the associated dimmer control (not shown). At each corner of the back side 293 of flat plate 292 is a short circular column 304 to space the flat plate 292 from the tope surface 180 of the mounting strap device 160 and hold plate 292 flat. The triangular buttons 262, 264 are joined to flat plate 292 by webs 306 and 308, respectively. The webs 294, 306 and 308 are thinner than the flat plate 292 while the pins 296 are as thick as the flat plate 292. The assembly of button array 290 and the frame 290 are shown in FIG. 23 which is a bottom plan view of the assembled parts.

Figure 24:
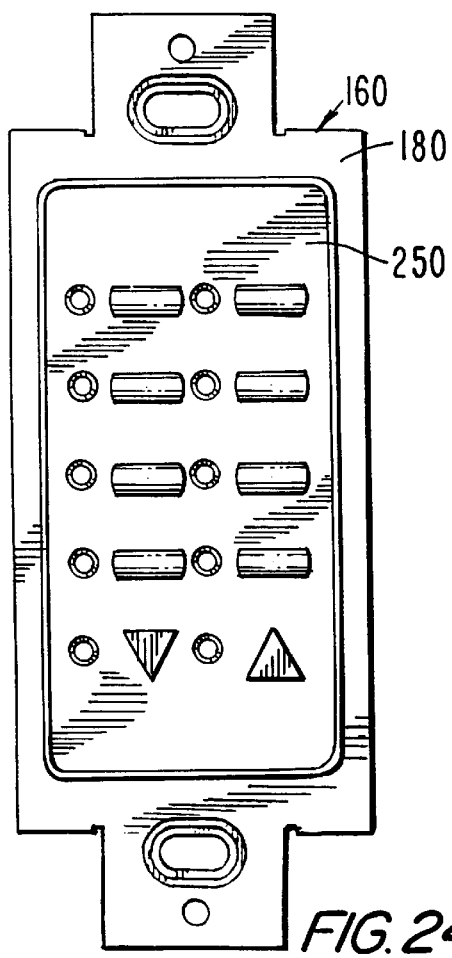
FIG. 24 is a top plan view of the dimmer button module of FIG. 17 assembled to the top surface of the mounting strap device of FIG. 15.

The assembly of the button module 250 to the top surface 180 of the mounting strap device 160 in the state shown in FIG. 15 is shown in FIG. 24. The appearance of the bottom surface 182 of the mounting strap device 160 in the state shown in FIG. 16 is shown in FIG. 25. The assembly fingers 272 each project through an aperture 181 and the locking surfaces 280 engage front wall 185 (not visible in the figure) as described above with reference to FIGS. 8a and 20. Each of the rods 302 project through apertures 310 which extend through the mounting strap device 160 from top surface 180 to bottom surface 182 and beyond to engage the dimmer control (now shown). The assembly of the button module 250 to the mounting strap device 160 also helps hold the button array 290 in assembly with the frame 266.

Figure 26:
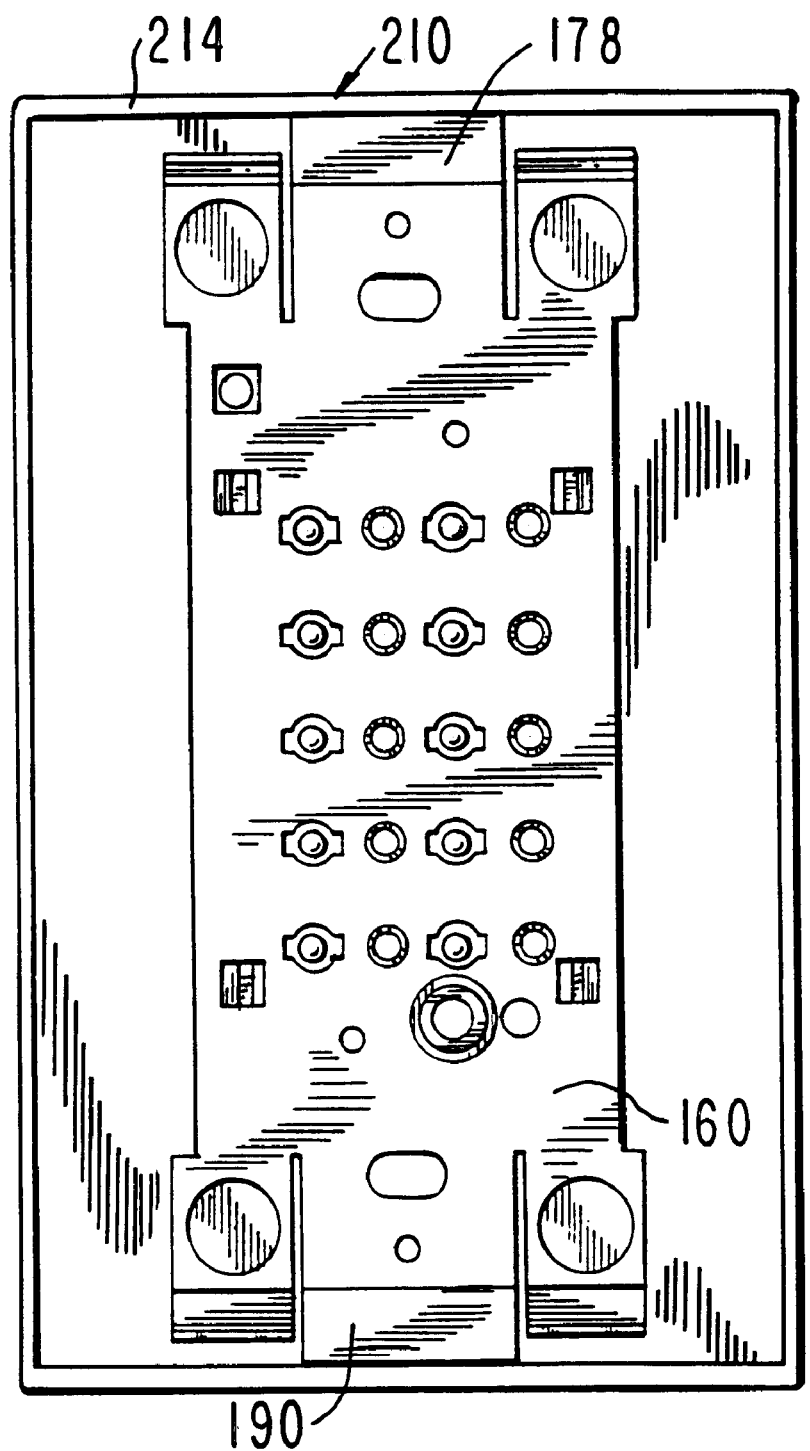
FIG. 26 is a bottom plan view of the device of FIG. 17 with the mounting strap device visible.

The assembly at the button module 250 to the mounting strap device 160, as shown in FIGS. 6 and 7, and to a wallplate 210 is shown in FIGS. 17 and 26 and described with reference to FIGS. 8 and 10.

The assembly of the button module 250 to the mounting strap device 160, as shown in FIGS. 11 and 12, and to a wallplate 234, with the button module 250 projecting through cut-out 240, is shown in FIGS. 27 and 28 and described with reference to FIGS. 3, 4, 5, 13 and 14.

The assembly of the button module 250 to the mounting strap device 160, as shown in FIGS. 15 and 16 and to a wallplate 245 is shown in FIGS. 29 and 30. The button module 250 projects through a cut-out 247 and the wallplate 245 is attached to the mounting strap device 160 by means of threaded fasteners 248 which pass through apertures (not visible in the figures) in the wallplate 245 and threadably engage threaded apertures 246 in mounting strap device 160.

It should be noted that wallplate 210 has the longest length and wallplate 245 is the shortest with wallplate 234 having an intermediate length. The actual peripheral dimensions can be varied as long as a ridge or inner wall on the back face of the wallplate, for example ridge or inner wall 214 of wallplate 210 is included and held to the required dimensions.

While there have been shown and described and pointed out the fundamental novel features of the invention as applied to the preferred embodiment, as is presently contemplated for carrying them out, it will be understood that various omissions and substitutions and changes of the form and details of the device illustrated and its operation may be made by those skilled in the art, without departing from the spirit of the invention.

We claim:

1. A mounting strap device adapted to mount a plurality of different types of wallplates comprising:
    a) a body portion having a top edge, a bottom edge spaced apart from said top edge and generally parallel therewith and two parallel, spaced apart side edges, said top edge, said bottom edge and said two side edges together defining a generally rectangular central portion;
    b) a first plurality of removable members adjacent said top edge, the first plurality of removable members including:
        at least one removable first tab; and
        at least one removable first side member substantially adjacent to the at least one removable first tab;
        wherein the at least one removable first tab engages a first type of wallplate when all of said first plurality of removable members are present and
        wherein the at least one removable first side member engages a second type of wallplate when the at least one removable first tab is removed;
    c) a second plurality of removable members adjacent said bottom edge, the second plurality of removable members including:
        at least one removable second tab; and
        at least one removable second side member substantially adjacent to the at least one removable second tab;
        wherein the at least one removable second tab engages said first type of wallplate when all of said second plurality of removable members are present and
        wherein the at least one removable second side member engages said second type of wallplate when the at least one removable second tab is removed; and
    d) said body portion further having a threaded aperture adjacent each of said top and bottom edges, each threaded aperture adapted to receive a threaded fastener therein and permit said mounting strap device to engage a third type of wallplate when all of said first and second pluralities of removable members are removed.

2. A mounting strap device adapted to mount a plurality of different types of wall plates comprising:
    a) a body portion having a top edge, a bottom edge spaced apart from and generally parallel with said top edge and two parallel, spaced apart side edges, said top edge, said bottom edge and said two side edges together defining a generally rectangular central portion;
    b) a first extension extending from a portion of said body portion top edge and having a first edge;
    c) a second extension extending from a portion of said body portion bottom edge and having a second edge;
    d) first removable tab coupled to said first extension at said first edge;
    e) a second removable tab coupled to said second extension at said second edge;
    f) when present said first and second removable tabs permit said mounting strap device to be coupled to a first type of wall plate;
    g) a first pair of removable side members, each coupled to said body portion at said top edge, one of said first pair of removable side members being mounted adjacent and separated from a side edge of said first extension;
    h) a second pair of removable side members, each coupled to said body portion at said bottom edge, one of said second pair of removable side members being mounted adjacent and separated from a side edge of said second extension;
    i) said first pair and second pair of removable side members permit said mounting strap device to be coupled to a second type of wall plate when said first and second removable tabs are removed; and
    j) a threaded aperture in each of said first and second extensions, each threaded aperture adapted to receive a threaded fastener therein and permit said mounting strap device to engage a third type of wall plate when said first and second removable tabs and said first and second pairs of removable side members are all removed.

3. A mounting strap device, as defined in claim 2, wherein said first removable tab has a first free end and said second removable tab has a second free end and said first and second free ends are tapered to each engage a complementarily tapered inner wall of said first type of wall plate to mount said first type of wall plate to said mounting strap device.

4. A mounting strap device, as defined in claim 3, wherein each of said first pair of removable side members has a first end and first flexible latch pawls thereat and each of said second pair of removable side members has a second end and second flexible latch pawls thereat, said first latch pawls engaging first racks on an inner wall of said second type of wall plate and said second latch pawls engaging second racks on an interior wall of said second type of wall plate to mount said second type of wall plate to said mounting strap device.

5. A mounting strap device, as defined in claim 2, wherein each of said first pair of removable side members has a first end and first flexible latch pawls thereat and each of said second pair of removable side members has a second end and second flexible latch pawls thereat, said first latch pawls engaging first racks on an inner wall of said second type of wall plate and said second latch pawls engaging second racks on an inner wall of said second type of wall plate to mount said second type of wall plate to said mounting strap device.

6. A mounting strap device, as defined in claim 2, wherein a joint between said first removable tab and said first extension at said first edge is scored to permit said first removable tab to be separated from said first extension and a joint between said second removable tab and said second extension at said second edge is scored to permit said second removable tab to be separated from said second extension.

7. A mounting strap device, as defined in claim 6, wherein a joint between said first pair of removable side members and said body portion at said top edge is scored to permit said first pair of removable side members to be separated from said body portion and a joint between said second pair of removable side members and said body portion at said bottom edge is scored to permit said second pair of removable side members to be separated from said body portion.

8. A mounting strap device, as defined in claim 2, wherein a joint between said first pair of removable side members and said body portion at said top edge is scored to permit said first pair of removable side members to be separated from said body portion and a joint between said second pair of removable side members and said body portion at said bottom edge is scored to permit said second pair of removable side members to be separated from said body portion.

9. A mounting strap device, as defined in claim 2, wherein said body portion has a first surface and a second surface and a plurality of apertures extending through said body portion from said first surface to said second surface to receive therein the locking fingers of a frame placed on said first surface to retain said frame upon said first surface.

10. A mounting strap device, as defined in claim 2, wherein said first type, said second type and said third type of wallplates are of differing lengths.

11. A mounting strap device, as defined in claim 10, wherein said first type of wallplate is the longest, said third type of wallplate is the shortest and said second type of wallplate has a length between the lengths of said first and third types of wallplates.

\* \* \* \* \*